3,198,647
TREATED PIGMENTS AND PROCESS FOR MODI-
FYING THE SURFACE OF PIGMENTS
Bernard H. Kress, Lafayette Hill, Pa., assignor to Quaker
Chemical Corporation, a corporation of Pennsylvania
No Drawing. Filed Apr. 19, 1961, Ser. No. 103,989
4 Claims. (Cl. 106—308)

This invention relates to treated pigments and to a process of treating pigments with polyacetals for modifying the surface properties of the pigments.

An object of this invention is to treat pigments to modify their surface in order to provide improved wetting either (1) by oily and fatty materials i.e., improve their lipophilic nature; or (2) by aqueous media i.e., to improve their hydrophilic nature. Another object is to provide pigments having improved grinding and dispersing properties in oily media and also in aqueous media. This invention facilitates the use of pigments for coating purposes, thereby providing improved protective, decorative or other functional coatings on paper, metal, wood, masonry, cement etc.

When pigments are used in coatings they must be well dispersed. Pigment particles must be non-agglomerated. They must be de-flocculated in the medium in which they are used. And most importantly there must be favorable interfacial relationships with the film-forming material. That is, the pigments themselves must show good adhesion to the solvents and binders forming the film. Improvement in the desired characteristics of pigments is accomplished by this invention. The treatment of the pigment with polyacetals has favorable effects on the rheological properties of paints formed from them. There is improvement in the continuity of film and the optical properties; for example, the depth of color, the gloss or the hiding power of the pigment is improved. Another advantage shown by the products of the invention is that the energy necessary for the dispersion of the pigments is decreased so that there is an economical advantage to carrying out the treatment as described in this invention.

My invention is carried out by treating the surface of an organic or an inorganic pigment with a polyacetal. A pigment in the sense in which it is used in this specification is defined as any material used to color, fill, deluster or otherwise modify a binder, such as in paints and surface coatings, paper, plastics, rubber, fibers and the like. The treated pigments may be organic or inorganic, or combinations of organic and inorganic elements. For example, silicates, such a kaolin, clay, bentonite, talc, mica, or lead silicate may be used. Further, carbonates, such as those of calcium, lead or copper; oxides, such as silicon dioxide, iron oxide, zinc oxide, antimony oxide or lead oxide or oxides of titanium, copper, magnesium and chromium may also be treated beneficially by the process of this invention. Sulfides, such as those of iron, antimony, cadmium, and zinc; sulfates, such as those of barium and calcium; and chromates, such as those of lead and zinc, are also pigments which may be used in this invention. Such organic materials as carbon blacks, ferrocyanide pigments, phthalocyanine colors, various lakes or combinations of organic and inorganic components are pigments which may be treated by the methods of this invention. Phthalocyanines, anthraquinones, vat, sulfur, azo and polyazo compositions, indanthrenes, ultramarines, benzidines, naphthols, and similar dyes and pigments which are not readily dispersible may also be treated in accordaance with this invention to obtain products useful in the above-mentioned arts and also in textile printing and dyeing.

The polyacetals used in my invention are compositions having a repeating unit of the structure

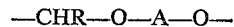

—CHR—O—A—O— where R is selected from the group consisting of hydrogen and alkyl radicals of not more than eight carbon atoms and A is the divalent radical attached to the hydroxyl groups of a diol. The polyacetals may be modified in many ways, e.g., with terminal or intermediate structures, such as amino, phenolic, carboxylic acid, amino triazine, and other groups. Although these materials are referred to as polyacetals this is meant to include polyformals having only polyformal groups and polyformals with hemiformal groups in them. Illustrative examples of polyacetals for use in my invention are acetal condensation products of alkylene and polyalkylene glycols as disclosed in U.S. Patents 2,786,081 and 2,785,949; long chain alcohol modified alkylene glycol acetals as disclosed in U.S. Patent 2,878,294; amine modified polyacetals as disclosed in U.S. Patent 2,890,242; triazine modified polyacetals as disclosed in U.S. Patent 2,895,923; phenol modified polyacetals as disclosed in U.S. Patent 2,902,470; dialdehyde acetals and pentaerythritol acetals as disclosed in U.S. Patent 2,785,996; polyesters modified by poly basic acids as disclosed in U.S. Patent 2,366,738; polyester-polyacetals as disclosed in U.S. Patent 2,366,738; polyesters modified by inorganic acids such as boric, phosphoric, silicic and titanic, polymeric acetals derived from dialkylene and polyalkylene glycols and aliphatic aldehydes modified with aliphatic alcohols containing 1 to 35 carbon atoms as disclosed in U.S. Patent 2,878,294; acetals of glutaraldehyde as disclosed in U.S. Patent 2,885,443. Included also are acetal condensation products and solutions of hemiacetals or mixtures with low molecular weight polyacetals which on application to the pigment surface may undergo further condensation. Polyacetals which may be applied to pigment surfaces according to my invention are specifically of the following types: polyformals derived from alkylene and polyalkylene glycols, polyformals from alkylene gycols modified with long chain alcohols, amine modified polyacetals, amino triazine modified polyacetals, phenol modified polyacetals, acetals from dialdehydes and from pentaerythritol, polyacetals modified by poly basic acids, and polyacetals modified by inorganic acids such as boric, phosphoric, silicic and titanic.

Polyacetals of the above compositions may be applied to comminuted pigments in any convenient way. They may be applied from solutions or dispersion, either aqueous or organic, by suspending the pigment in the solution or dispersion, allowing time for the pigment to adsorb the polyacetal, filtering to remove excess of the liquid phase and drying the treated pigments. Alternatively, it is possible to slurry the pigment in the solution and thereafter evaporate the solvent leaving a deposit of the polyacetal on the surface of the pigment. Other methods of application are obvious, such as to spray a solution of the polyacetal onto the pigment followed by drying. The technique of application is relatively simple as the polyacetal may be applied at a relatively low temperature. No curing is required; that is, the pigment need not be heated at an elevated temperature to accomplish the results of the invention.

The amount of polyacetal remaining on the pigments is very small. Although the surface of most pigments is large compared to their volume, the amount of polyacetal required is that quantity which will produce a surface layer of polyacetal of molecular thickness. It is difficult to state exactly the amount needed as a percentage of the weight of the pigment since densities and surface-volume ratios may vary widely. Usually amounts of the order of about 0.01 to about 1% by weight are sufficient.

To apply this small amount, solutions or dispersions of higher concentrations may be used. For example, solutions with as little as 0.5% and as high as 20% by weight polyacetal may be used.

The treated particulate pigments of this invention possess properties which are improved over the untreated pigments with respect to interfacial tension against liquids of different types.

The changed properties may be demonstrated qualitatively by noting the behavior of treated pigments in a mixture of, say, water and toluene or water and benzene, and comparing the behavior of untreated pigment.

If the pigment has hydrophilic properties originally it will be wetted by the water, will not be wetted by the hydrocarbon, and will remain suspended in the water layer. When treated with the appropriate polyacetal, the surface becomes organophilic and the pigment becomes preferentially wetted by the hydrocarbon and becomes suspended in the nonaqueous layer.

Experiments of this type are reported in the illustrative examples given herein to demonstrate the effect of the treatments of this invention.

Another demonstration of the improved qualities of the pigments treated with polyacetals is more quantitative and has specific reference to paint technology. In this test the pigments, treated and non-treated, are mixed with linseed oil under comparable conditions. The dispersion is then evaluated by making a standard drawdown with the North Standard Gauge. The fineness of the grind is measured in this way.

The preparation of a number of polyacetals illustrative of the kinds of compositions which may be used in this invention are given in Preparations A through L.

PREPARATION A

An amine modified polyacetal was prepared as described in U.S. Patent 2,890,242 from triethanolamine quaternized with methyl para-toluene solfonate and reacted with dipropylene glycol and paraformaldehyde as follows.

Methyl p-toluene sulfonate, 100 parts, was added dropwise to a solution of 75 parts of triethanolamine in 100 parts of water. The mixture was heated to approximately 80° C. and then after the exothermic heat of reaction had subsided the mixture was heated for 2 hours at approximately 80° C.

One hundred and forty-eight parts of this solution containing 70 parts of methyl triethanol-ammonium p-toluene sulfonate were mixed with 110 parts of dipropylene glycol, 33 parts of 91% paraformaldehyde, 0.1 part of p-toluene sulfonic acid and 40 parts of toluene. The mixture was refluxed in a Dean and Stark apparatus and the water was separated. After 23 parts of water of reaction in addition to the water present in the system had been removed in the trap the toluene was evaporated in vacuo leaving a clear, light amber liquid which was water dispersible.

PREPARATION B

This illustrates the preparation of a dibasic acid modified polyacetal (see U.S. Patent 2,366,738).

|  | Parts |
|---|---|
| Dipropylene glycol | 268 |
| Maleic anhydride | 40 |
| Paraformaldehyde (91%) | 59 |
| p-Toluene sulfonic acid | 0.2 |
| Toluene | 40 |

These materials were refluxed under a Dean and Stark trap until 35 parts of water were removed. The toluene was then evaporated in vacuo to yield an amber, somewhat viscous water-soluble product.

PREPARATION C

This preparation illustrates the formation of an amine modified polyacetal (see U.S. Patent 2,890,242).

|  | Parts |
|---|---|
| Diethylene glycol | 106 |
| Methyl triethanolammonium p-toluene sulfonate (80% in water) | 105 |
| Paraformaldehyde (91%) | 41 |
| p-Toluene sulfonic acid | 0.1 |
| Toluene | 35 |

These materials were refluxed under a Dean and Stark trap until 48 parts of water were removed. The product was isolated by evaporation of the toluene in vacuo.

Preparation D, which follows, represents the formation of a diethylene glycol polyformal.

PREPARATION D

|  | Parts |
|---|---|
| Diethylene glycol | 106 |
| Paraformaldehyde (91%) | 33 |
| Sulfuric acid (99%) | 0.1 |
| Toluene | 20 |

These substances were heated under reflux with a moisture trap inserted between the flask and the reflux condenser. After 18 parts of water of reaction were withdrawn from the reaction mixture, it was heated in vacuo with agitation to remove toluene. The resulting product was then neutralized with dilute sodium hydroxide solution to a pH of 7. The product was completely soluble in water and in toluene. It had a faint, ethereal odor and was somewhat viscous. It was free of formaldehyde odor, had a molecular weight of 480 (Rast) and a hydroxyl equivalent of 220. Its specific gravity was 1.155 at 94° F. and its refractive index was $N_D^{30}=1.462$.

This polyacetal and similar products are described in U.S. Patent 2,786,081.

An amino triazine modified polyformal was prepared by the directions given under preparation E.

PREPARATION E

|  | Parts |
|---|---|
| Paraformaldehyde (91%) | 43 |
| Diethylene glycol | 133 |
| Para-toluene sulfonic acid | 0.3 |
| Water | 40 |

The above mixture was refluxed with stirring until a clear water-white solution formed. To this solution were added 32 parts of melamine. Heating and stirring under reflux was continued for 45 minutes until the melamine went into solution. A clear viscous syrup was obtained which was soluble in water.

PREPARATION F

|  | Parts |
|---|---|
| Diethylene glycol | 159 |
| Paraformaldehyde (91%) | 50 |
| p-Toluene sulfonic acid | 0.4 |

The diethylene glycol and paraformaldehyde were heated in the presence of the toluene sulfonic acid to effect a clear solution. Then 21 parts of melamine were added to the mixture and heating was continued until a clear solution was obtained.

Preparations E and F represent amino triazine modified polyformals typical of those described in U.S. Patent 2,895,923.

PREPARATION G

This composition was prepared as described under Preparation F except that 10 parts of sorbitol were added to the initial portion of the reaction.

PREPARATION H

An alcohol modified acetal was prepared by the procedures of U.S. Patent 2,878,294.

| | Parts |
|---|---|
| Tridecyl alcohol (oxo process) | 100 |
| Diethylene glycol | 530 |
| Paraformaldehyde (91%) | 165 |
| Toluene | 35 |
| p-Toluene sulfonic acid | 0.1 |

The above materials were mixed together and heated under reflux, using a Dean and Stark moisture trap. After the water of reaction had all been removed, the toluene was evaporated. The liquid water-soluble product remained.

PREPARATION I

A phenol modified polyacetal was prepared by a method of U.S. Patent 2,902,470.

| | Parts |
|---|---|
| Phenol | 47 |
| Diethylene glycol | 53 |
| Paraformaldehyde (91%) | 33 |
| Toluene | 30 |
| p-Toluene sulfonic acid | 0.3 |

The mixture was refluxed under a Dean and Stark trap until 15 parts of water were removed azeotropically. The toluene was then distilled off in vacuo. The remaining product was a viscous almost water-white liquid.

PREPARATION J

An acetal condensation product of glutaraldehyde was prepared as described in U.S. Patent 2,885,443.

| | Parts |
|---|---|
| Diethylene glycol | 35.55 |
| 2-ethoxy-2,3-dihydropyrane | 42.95 |
| Methanol | 21.46 |
| p-Toluene sulfonic acid | 0.04 |

This above mixture was heated until an exothermic reaction occurred, then refluxed for one hour. A pale straw colored liquid acetal was obtained which had a slight penetrating odor and was soluble in water.

PREPARATION K

A water solution of a pentaerythritol acetal condensation product was made according to U.S. Patent 2,785,996 by combining the following materials:

| | Parts |
|---|---|
| 2-hydroxy adipaldehyde | 4.5 |
| Commercial pentaerythritol | 4.5 |
| Oxalic acid | 1.0 |
| Water | 90.0 |

PREPARATION L

A phosphoric acid modified polyacetal was obtained as follows:

| | Parts |
|---|---|
| Diethylene glycol | 159 |
| Paraformaldehyde (91%) | 33 |
| Phosphoric acid (70%) | 70 |
| Toluene | 40 |
| p-Toluene sulfonic acid | 0.1 |

These components were refluxed together under a Dean and Stark trap until 42 parts of water had been removed. The toluene was evaporated in vacuo; a water-soluble syrup remained.

The various polyacetals and acetal condensation products are applied to pigments as shown above by suspending the pigment in the solution of the acetal, filtering and drying. The surface properties of the pigments are thereby changed.

The preparation of treated pigments is given in the examples which follow. The pigments so treated represent a number of different classes. For example, the clay pigments or fillers are represented by bentonite which is a clay-rock having a number of the montmorillonite group of clay minerals present in it. Another montmorillonite-type clay is talc which is treated in Example 4. The kaolin used in Example 3 represents also a broad group of minerals having definitely known structures which are in the aluminum silicate class. Fuller's earth is another type of a clay mineral, also a silicate. In other examples, oxides, carbonates, chromates and phthalocyanine pigments are used.

Example 1

| | Parts |
|---|---|
| Preparation A | 20 |
| Toluene | 30 |
| Bentonite | 30 |

These components were refluxed together under a Dean and Stark trap. When 5 parts of water had been removed the treated bentonite was decanted through a filter and dried. The treated bentonite was shaken vigorously in a mixture of butanol and water. It entered the butanol layer. Untreated bentonite remained in the water layer, thus demonstrating the fact that the bentonite had been given hydrophobic properties.

Example 2

Thirty-five parts of fuller's earth (200 mesh) were mixed with a dispersion of 20 parts of Preparation A in 100 parts of water. After being shaken, the aqueous slurry was decanted through a filter and the treated fuller's earth dried. When this was shaken in a mixture of butanol and water the fuller's earth entered the butanol layer. Untreated fuller's earth wet out rapidly with water and entered the aqueous layer.

Example 3

North Carolina kaolin was treated with Preparation A by the procedure of Example 2. The dried pigment when shaken with butanol and the water entered the butanol layer. The untreated clay entered the water layer.

Example 4

Micronized talc was treated with Preparation A by the process of Example 2. Shaken with butanol and water the treated talc entered the butanol layer whereas untreated talc entered the water layer.

Example 5

Powdered pumice was also treated with Preparation A by the procedure of Example 2. The treated pumice showed a similar hydrophobic behavior and entered the butanol layer.

Example 6

Rutile titanium dioxide was treated with Preparation A by the process of Example 2. The dried pigment when shaken with a mixture of butanol and water went slowly into the organic layer. In a separate experiment untreated material dispersed in the water layer.

Example 7

Amorphous silica (Whitaker, Clark & Daniel No. 27) showed a similar behavior when it was treated with Preparation A by the process described in Example 2.

Example 8

Activated carbon when untreated and shaken in butanol and water remained suspended in both butanol and water layers. When it was treated with Preparation A according to directions of Example 2, the carbon black entered the organic layer.

Example 9

Calcium carbonate was treated with Preparation A as in Example 2. When shaken with a mixture of butanol and water the pigment remained in the aqueous layer.

A similar sample treated with Preparation D by the procedure given in Example 2, when shaken with butanol and water, rapidly entered the butanol layer.

Example 10

Zinc oxide showed a behavior similar to the calcium carbonate when treated as in Example 9.

Example 11

A clay used for many filling operations and known as Huber No. 43 was treated with Preparation A as in Example 2. The treated pigment was taken up in the butanol layer when shaken with a mixture of butanol and water.

Example 12

Bentonite was treated with the amine modified polyacetal described in Preparation C by the procedure of Example 2. The treated product entered the aqueous layer when shaken with butanol and water. Particles did not gel in water but remained freely suspended. Untreated bentonite gelled in water. The diethylene glycol in Preparation C makes the pigment more hydrophilic when the pigment prepared with Preparation A where dipropylene glycol was used.

Example 13

The pigment prepared in Example 1 after standing one year at ambient laboratory temperatures (65–90° F.) was suspended in a water-toluene mixture and shaken vigorously. The treated pigment entered the toluene layer readily.

Example 14

The activated carbon prepared as described in Example 8 was tested after standing for one year by suspending in a water-toluene mixture and shaking vigorously. The treated pigment readily entered the toluene layer.

Example 15

In the following series of experiments a rutile titanium dioxide pigment in an intermediate stage of manufacture as a wet cake was suspended in water to form a slurry. Polyformals prepared as described above and identified by the letters in the table below were added to the slurry so that the aqueous phase contained 0.5% by weight. After further slurrying the pigment was filtered and dried in an oven at 110° C.

A 50-gram sample of pigment obtained by each treatment was added to 225 grams of linseed oil in a high speed blendor (Waring Blendor) for 1, 3, and 6 minutes. The ease of dispersion was estimated by a standard drawdown technique using a North Standard Gauge for fineness of grind. Higher numbers represent finer grinds. Numbers from 0 to 8 may be read on the gauge.

*Fineness of Grind of Rutile Titanium Dioxide*

| Time, Minutes in Blendor | Untreated Titanium Dioxide | Treated pigment, 0.5% | | | |
|---|---|---|---|---|---|
| | | D | E | F | G |
| 1 | 0 | 4.5 | 2.0 | 0 | 1.0 |
| 3 | 3 | 5.7 | 3.8 | 4.5 | 4.0 |
| 6 | 4.3 | 6.5 | 5.7 | 4.5 | 5.7 |

It is to be noted that after one minute of blending all except Preparation F give a fineness of grind much improved over the untreated titanium dioxide. In six minutes the fineness of grind with the exception of Preparation F was in every case better than the untreated pigment.

Such treated pigment is valuable not only in paint making but also in plastic milling and delustering viscose rayon.

Example 16

The products of Preparations A and B were dispersed in water to form 20% solutions of each. Chrome yellow and a copper phthalocyanine (Monastral Blue Lake) were immersed in each solution using 35 parts of pigment per 100 parts of dispersion. The mixtures were shaken, decanted through a filter and the treated pigment dried. The dried pigments were then ground and separated into separate samples. One sample was mixed with a mixture of cottonseed oil and water; the other sample was mixed with a mixture of xylene and water. After the pigments were treated in this way it was noted whether they entered the cottonseed oil layer, the xylene layer, or the water layer. Results are indicated in the following table.

| Pigment | Preparation | Disposition of pigment |
|---|---|---|
| COTTONSEED OIL-WATER | | |
| Chrome yellow | A | Pigment dispersed throughout both layers. |
| Do | B | Pigment at upper interface of oil layer; none in water. |
| Do | Control | Pigment dispersed throughout both layers. |
| Monastral Blue Lake | A | Pigment dispersed throughout both layers. |
| Do | B | Pigment in upper layer; none in water. |
| Do | Control | Dispersed throughout both layers. |
| XYLENE-WATER | | |
| Chrome yellow | A | Dispersed throughout both layers. |
| Do | B | Pigment in water at the interface; none in the xylene. |
| Do | Control | Dispersed throughout both layers. |
| Monastral Blue Lake | A | Largely at interface in xylene; none in water. |
| Do | B | None in xylene; in water layer and interface. |
| Do | Control | Dispersed throughout both layers. |

The results with the treated Monastral Blue Lake when shaken with the xylene and water are interesting in that when treated with Preparation A the pigment is not in the water and largely at the interface in the xylene layer, but when treated with Preparation B there is none in the xylene layer and the pigment is dispersed in the water layer near the inteface. This demonstrated that the hydrophilic or hydrophobic nature of the surface of this pigment can be reversed by treating with the appropriate acetal.

The pigments treated in accordance with this invention are particularly advantageous in pigment coloration or delustering of fibers prior to melt, wet or dry spinning of the fibers, such as viscose, nylon, cellulose acetate, polyesters, acrylonitrile copolymers, polyamides, etc.

It will be apparent from the foregoing specification and illustrative examples that this invention can be applied to a wide variety of pigments by treatment with a suitable acetal and that the original surface-active characteristics of the pigments can be modified to provide hydrophilic or hydrophobic characteristics as may be desired depending upon the medium in which the treated pigment will be used. It will also be apparent to one skilled in this art from the foregoing teachings how to select and test the effectiveness of any acetal to obtain desired results for any specific pigment.

I claim:
1. A pigment provided with a surface coating of an amine modified polyacetal reaction product made under acidic conditions and at reflux temperatures of a salt of an amino alcohol containing at least two hydroxy groups, an alkylene diol, and an aldehyde, said salt being selected from the group consisting of amine salts and quaternary ammonium salts of strong acids and said aldehyde containing not more than eight carbon atoms in monomeric form, said reaction product having at least two aldehyde units and at least two polyhydric alcohol units per molecule.

2. A pigment provided with a surface coating of a polymeric acetal condensation product made under acidic conditions and at reflux temperatures of an ethanolamine salt, diethylene glycol, and formaldehyde, said ethanolamine being selected from the group consisting of monoethanolamine, diethanolamine, and triethanolamine, and said salt being selected from the group consisting of amine salts and quaternary ammonium salts of strong acids, said condensation product having at least two aldehyde units and at least two polyhydric alcohol units per molecule.

3. A pigment provided with a surface coating of polymeric acetal condensation product comprising the reaction product of at least one dialkylene glycol in which the alkylene radical has 2 to 4 carbon atoms in a straight chain and at least one aliphatic monoaldehyde containing 1 to 8 carbon atoms, said condensation product containing per molecule at least two dioxyalkylene radicals derived from said dialkylene glycol and at least two alkylidene radicals derived from said aldehyde.

4. A pigment provided with a surface coating of a polymeric acetal condensation product of diethylene glycol and formaldehyde, said condensation product containing per molecule at least two dioxyalkylene radicals derived from said diethylene glycol and at least two alkylidene radicals derived from said formaldehyde.

References Cited by the Examiner
UNITED STATES PATENTS

| | | | |
|---|---|---|---|
| 2,211,323 | 8/40 | Fordyce. | |
| 2,366,738 | 1/45 | Loder et al. | 260—67 XR |
| 2,379,237 | 6/45 | Jenkins | 260—37 |
| 2,413,275 | 12/46 | Wilson et al. | 260—73 |
| 2,785,947 | 3/57 | Kress et al. | |
| 2,785,996 | 3/57 | Kress | 260—67 |
| 2,786,081 | 3/57 | Kress | 260—67 XR |
| 2,870,097 | 1/59 | Pattison | 260—67 XR |
| 2,895,923 | 7/59 | Kress | 260—67 XR |
| 2,902,470 | 9/59 | Kress | 260—58 XR |
| 2,905,721 | 9/59 | De Benneville | 252—89 |
| 3,024,209 | 3/62 | Ferrigno | 117—100 |
| 3,067,053 | 12/62 | Tarantino | 106—308 |

MORRIS LIEBMAN, *Primary Examiner.*

MILTON STERMAN, ALEXANDER H. BRODMERKEL, *Examiners.*